United States Patent Office

2,847,457
Patented Aug. 12, 1958

2,847,457

STEROID INTERMEDIATES

William S. Johnson, Madison, Wis., Alexander D. Kemp, Rochester, N. Y., and Raphael Pappo, Madison, Wis., assignors to Wisconsin Alumni Research Foundation, Madison, Wis., a corporation of Wisconsin No Drawing. Application May 26, 1955
Serial No. 511,397

14 Claims. (Cl. 260—488)

The present invention relates to the steroid field and in particular to non-aromatic steriods in which ring C is oxygenated. The preferred intermediate or starting material employed in the synthesis is the tetracyclic ketone I (1-methoxy-8-keto-10a-methyl-5,6,8,9,10,10a,11,12-octahydrochrysene) described in the William S. Johnson application Serial No. 301,369, filed July 28, 1952, now abandoned. See also Johnson application Serial No. 424,505 filed April 20, 1954, now abandoned.

The 6a,7- and 4b,10b-double bonds, as well as the $C_8$-carbonyl group of the tetracyclic ketone I can be selectively reduced to give several different stereoisomers of the 1 - methoxy-8-hydroxy-10a-methyl-dodecahydrochrysene of Formula XVIII. The tetracyclic ketone I was treated with ethyl orthoformate to produce the crystalline enol ethyl ether II, M. P. 136°, with $\lambda$ max 227 m$\mu$ (log $\epsilon$ 4.58), which is characteristic of the diene structure and shows that the styrene double bond remained at 4b, 10b and had not migrated to the alternate 4b,5-position. The structure was confirmed by hydrolytic regeneration of the tetracyclic ketone I. The 6,6a-double bond of the enol ether was selectively hydrogenated over palladium-on-strontium carbonate giving a product which did not appear to be homogeneous, and probably consisted of a mixture of the dihydro enol ether with the double bond at 7,8 and 8,9. The latter, which is a rearrangement product of the former, corresponds to the structure that was established for the dihydro enol ether of cholestenone. Acid hydrolysis of the dihydro enol ether gave a single product, M. P. 176°, which has been shown to be the expected A/B-trans-dihydro ketone IV. The ultraviolet absorption spectrum of IV, $\lambda$ max 222 and 265.5, is typical of the m-methoxystyrene chromophore. The $\lambda$ min at 244 m$\mu$ (log $\epsilon$ 3.88) as compared with the intense absorption (log $\epsilon$ about 4.35) for the tetracyclic ketone I clearly shows that the $\alpha,\beta$-unsaturated ketone chromophore was lost, and that the 6a,7-double bond was indeed reduced.

The enol acetate XVI, M. P. 138°, was formed readily from the tetracyclic ketone I. Reduction of XVI with sodium borohydride yielded a dihydro alcohol represented by Formula XVII.

Hydrogenation of the tetracyclic ketone I over palladium-on-carbon in the presence of a trace of potassium hydroxide resulted in stereoselective reduction to give a new dihydro ketone, M. P. 121°, in high yield. The ultraviolet spectrum was identical with that of IV showing only the m-methoxystyrene chromophore; hence the new stereoisomer must be the A/B-cis-dihydro ketone XI.

Both dihydro ketones IV and XI underwent stereoselective reduction with lithium aluminum hydride to give crystalline hydroxy compounds formulated as VII (hydroxyl 8$\beta$) and X (hydroxyl 8$\alpha$), respectively. It is noteworthy that the reduction product of IV gave a precipitate with digitonin while that from XI did not, which is consistent with the $\beta$ and $\alpha$ orientation of the hydroxyl groups, respectively.

Catalytic hydrogenation of the A/B-trans-dihydro ketone IV over 30% palladium hydroxide-on-strontium carbonate proceeded stereoselectively to give the trans-anti-cis ketone-A, M. P. 187°. A small proportion of the trans-anti-trans ketone-B (described below) was isolated from mother liquors. Ketone-A could also be produced from the enol ether II by allowing the hydrogenation to proceed beyond the dihydro stage (III) to reduce the styrene bond. Acid hydrolysis of the resulting tetrahydro enol ether gave ketone-A. The ultraviolet absorption spectrum of this ketone—$\lambda$ max 271.5 m$\mu$ (log $\epsilon$ 3.09), 278.5 (3.13); $\lambda$ min 243.5 (1.98), 275.5 (3.04)—is practically identical with that of 5-methoxytetralin showing clearly that the styrene bond was indeed reduced.

Reduction of ketone-A either with lithium aluminum hydride or by hydrogenation over platinum oxide proceeded stereoselectively yielding an alcohol, M. P. 132° represented by Formula VIII. This product was also formed directly by palladium-catalyzed hydrogenation of 1 - methoxy-8-hydroxy-10a-methyl-5,6,8,9,10,10a,11,12-octahydrochrysene, M. P. 147°, which was obtained by the action of lithium aluminum hydride on the tetracyclic ketone I.

When the A/B-trans-dihydro ketone IV converted to the ethylene ketal V, M. P. 112°, and this derivative treated with lithium and alcohol in ammonia, the 4b,10b-(styrene) double bond was reduced stereoselectively to produce VI, M. P. 124°, which on acid hydrolysis yielded a tetrahydro ketone, M. P. 211°, having an ultraviolet spectrum identical to that of ketone-A. This new isomer is the trans-anti-trans ketone-B. Ketone-B could also be obtained in somewhat lower yield by lithium-ammonia-alcohol reduction of the dihydro enol ether III followed by acid hydrolysis. In the reduction of the ketal V described above, a small yield of an isomeric tetrahydro ketal, M. P. 138°, was isolated, and this on acid hydrolysis yielded ketone-A. When the ketal V was treated with lithium in ammonia at 150 p. s. i. and 25°, then with alcohol at atmospheric pressure, extensive demethylation as well as reduction occurred yielding the ketal phenol (formula VI with OH in place of $OCH_3$ at the 1-position), M. P. 191°, which on acid hydrolysis afforded the trans-anti-trans phenolic ketone, M. P. 235°.

Lithium aluminum hydride reduction of ketone-B proceeded stereoselectively to give an alcohol, M. P. 124° and 137°, which gave a precipitate with digitonin and is represented by Formula IX in which the hydroxyl group is $\beta$-oriented. The best method of preparing this alcohol is by a one-step reduction of the tetracyclic ketone I with sodium or lithium and alcohol in ammonia. The product was conveniently isolated as the acetate, M. P. 146°.

Catalytic hydrogenation of the A/B-cis-dihydro ketone XI over 30% palladium hydroxide-on-strontium carbonate proceeded stereoselectively to give a new tetrahydro ketone, M. P. 104°, having an ultraviolet spectrum identical with that of ketone-A showing that the 4b,10b-(styrene) bond was reduced. The configuration has been proved to be cis-syn-cis ketone-C. Lithium aluminum hydride reduction of ketone-C gave stereoselectively the corresponding alcohol, M. P. 125°, which failed to give a precipitate with digitonin and is assigned the 8$\alpha$-configuration.

Conversion of the A/B cis-dihydro ketone XI to the ketal XII, followed by lithium and alcohol in ammonia resulted in reduction of the 4b,10b-(styrene) double bond, as shown by ultraviolet spectroscopy, to produce a mixture of tetrahydro ketals, M. P. 110° and 211°. The former (XIII), preponderant isomer on acid hydrolysis yielded a new tetrahydro ketone, M. P. 136°, which proved to be the cis-anti-trans ketone-D. The higher-melting ketal, XIV, yielded on hydrolysis another tetrahydro ketone, M. P. 174°, which is formulated as the cis-anti-cis ketone-E, by analogy to the configuration of the product formed in lesser amount upon similar reduction of the A/B-trans-dihydro ketal V. Both ketones-D and -E had ultraviolet spectra identical with that of ketone-A. Reduction of ketone-E with lithium aluminum hydride gave a mixture of $C_8$ epimeric alcohols, M. P. 181° and 158°. The latter, but not the former, gave a precipitate with digitonin and the alcohols are accordingly assigned the $8\beta$ and $8\alpha$ configurations, respectively.

1 - methoxy - 6a - acetoxy - 8 - keto - 10a - methyl - 5, 6,6a,7,8,9,10,10a,11,12-decahydrochrysene (XXII) (cf. W. S. Johnson, Ser. No. 424,505, filed April 20, 1954, now abandoned) was hydrogenated in the presence of 30% palladium hydroxide on strontium carbonate catalyst to give the 4b,10b-dihydro compound (XXIII). The large acetyl group offers hindrance to the approach of the catalyst to the backside of the molecule, thus hydrogen preferentially adds to the topside, and the resulting compound thus has the trans-syn-cis configuration. Five hours heating of (XXIII) with sodium methoxide gave ketone-F (XXIV). Reduction of ketone-F with lithium and alcohol in liquid ammonia gave the carbinol (XXV). The preceding subject matter is disclosed and claimed in the copending Johnson, Bannister and Rogier application, Serial No. 511,396, filed May 26, 1955, now Patent No. 2,810,758.

In order to carry out the present invention, a 1-methoxy-8-hydroxy-10a-methyl-dodecahydrocrysene of Formula XVIII is esterified to produce a 8-acyloxy derivative, preferably the acetoxy compound (XIX). The latter when heated with lead tetraacetate gives the 12-acetoxy derivative (XX). Further heating of XX in acetic acid causes elimination of the elements of acetic acid, giving the 11,12-dehydro compound (XXI). Compound XXI is reacted with a carboxylic peracid (R'OOH, where R'=acyl) to form an 11,12-oxido compound which is usually not isolated but reacts with excess acid to give the 11-hydroxy-12-acyloxy compound (XXVI). The nature of the carboxylic peracid used in this reaction is not critical; it is derived from any carboxylic acid of relatively low molecular weight, i. e. one of from one to about eight carbon atoms, and can be of the aliphatic or aromatic type. Performic acid (usually prepared in situ from formic acid and hydrogen peroxide), peracetic, monoperphthalic, and perbenzoic acid are preferred peracids. The compound XXVI, which need not be purified before carrying out the next step is treated with an alkali metal, e. g. sodium or lithium, in alcohol and liquid ammonia which eliminates the 12-acyloxy group and also removes the ester grouping at the 8-position, giving the 1 - methoxy - 8,11 - dihydroxy - 10a - methyl - dodecahydrochrysene (XXVII). Treatment of compound XXVII further with an alkali metal-alcohol-ammonia mixture, followed by hydrolysis, demethylates and reduces the aromatic ring, giving a mixture of $\Delta^{4a,12a}$- and $\Delta^{2,3}$-1-keto - 8,11 - dihydroxy - 10a - methyl - hexadecahydrochrysenes (XXVIII and XXIX). The remaining double bond can be hydrogenated catalytically to give the 1-keto - 8,11 - dihydroxy - 10a - methyl - octadecahydrochrysene (XXX). The latter is a key intermediate in the preparation of steroids. An angular methyl group can be introduced in the 12a-position and the six-membered ring D transformed into a five-membered ring according to the method disclosed by Johnson et al., J. Am. Chem. Soc., 75, 4866-7 (1953), for the corresponding compounds lacking an 11-oxygen substituent.

Charts 1, 2 and 3 illustrate by general formulae various reactions referred to above.

CHART 1 (A/B TRANS SERIES)

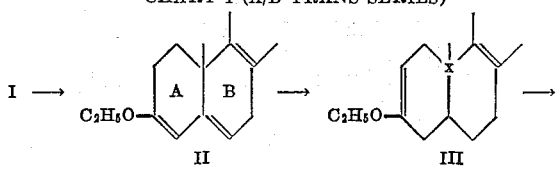

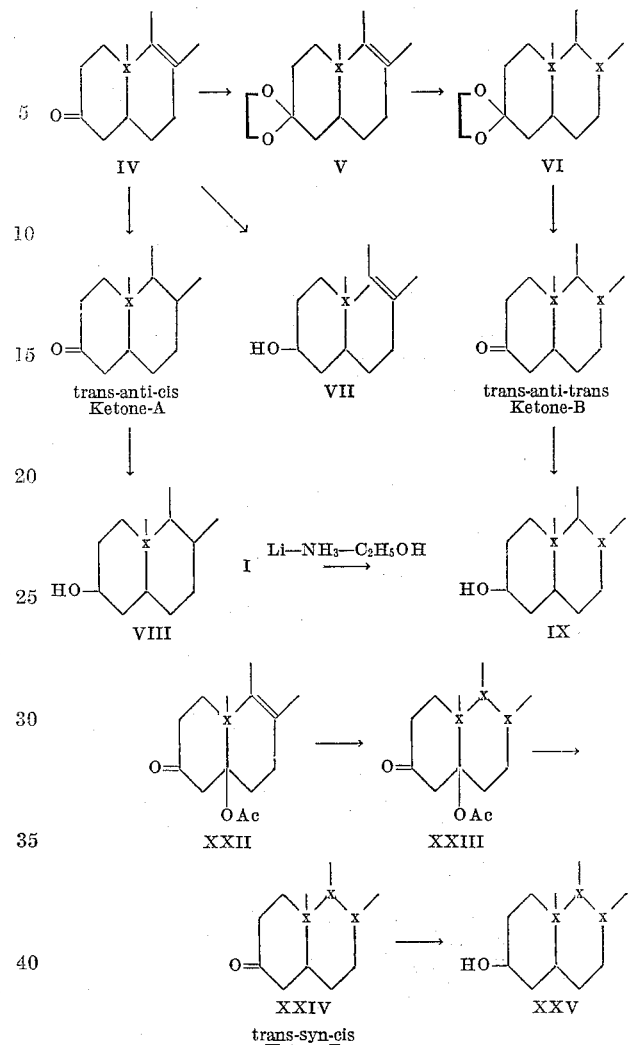

CHART 2 (A/B CIS SERIES)

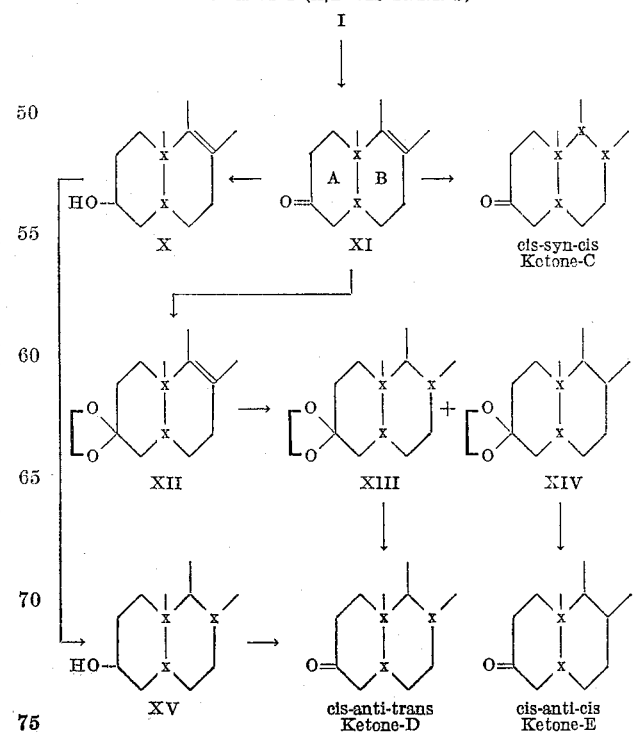

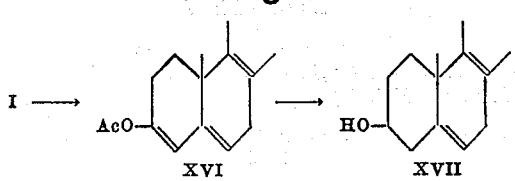

ing over sodium sulfate and evaporation of the solvent an oil was obtained. Five similar runs were combined to yield 103 g. of oil λ max 278, 272 mμ, λ min 276, 244 mμ (characteristic anisole absorption). This oil was dissolved in about 1 l. of ether. The solution was cooled and scratched, whereupon crystals began to appear. The formation of crystals was slow in the beginning but the

CHART 3

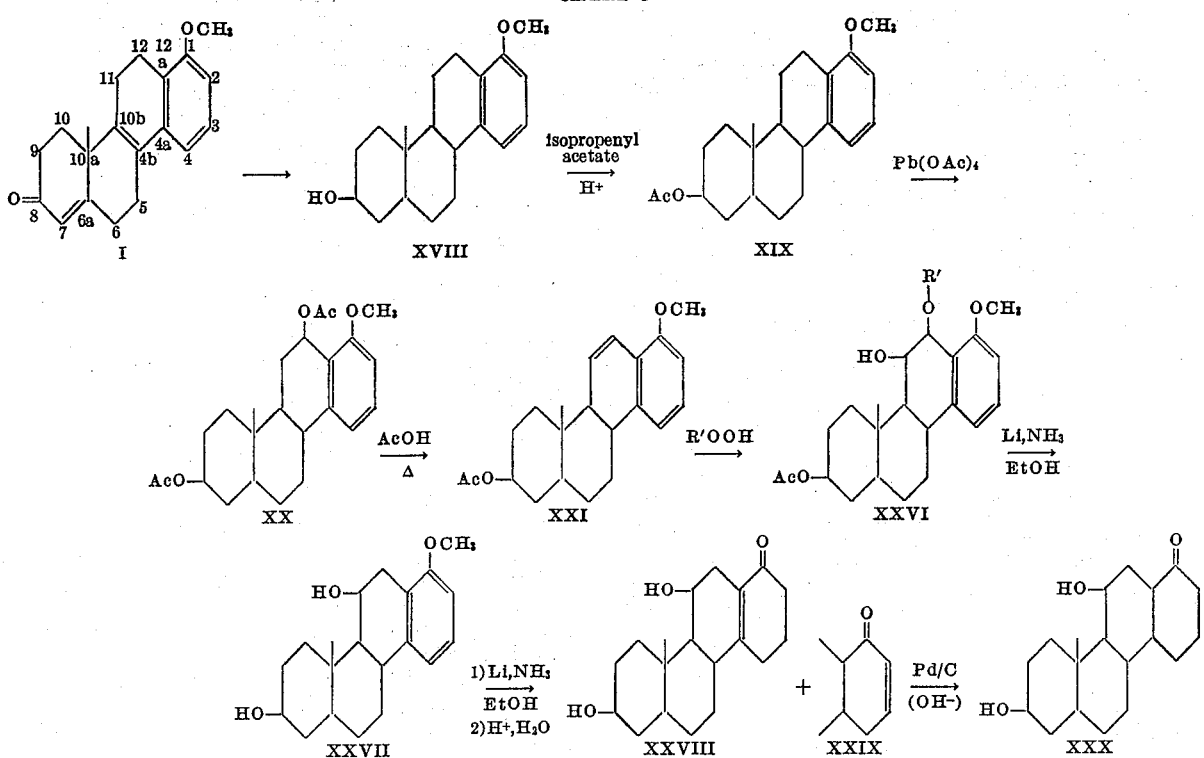

The following examples will serve to illustrate the invention.

EXAMPLE I

Trans - anti - trans - 1 - methoxy - 8β - hydroxy - 10a-methyl - 4b,5,6,6a,7,8,9,10,10a,10b,11,12 - dodecahydrochrysene IX The tetracyclic ketone (I) (20.00 g.) M. P. 175–176.5° was dissolved in 300 cc. of warm anhydrous distilled dimethoxyethane and was poured slowly with vigorous stirring into the reaction flask containing 5 l. of liquid ammonia. After the addition was completed 500 cc. of absolute commercial ethanol was added, followed immediately by 11 g. of cut lithium wire which was dropped into the reaction mixture over a 2 to 3 minute period. The ketone (I) which was partly out of solution at the beginning of the reduction had at the end of this period completely dissolved. More lithium (21 g.) was then added over a period of 15 to 20 minutes.

As soon as the blue color of the metal disappeared the flask was warmed with the steam bath to boil off the ammonia. When the mixture started to thicken one liter of ether was added to help in the removal of the ammonia by codistillation. The last traces of ammonia were expelled by adding more ether (1.5 l.) and codistilling until the mixture thickened again. The steam was then turned off and iced water (1.5 to 2 liters) was carefully added to the stirred mixture. Enough water and ether should be added to obtain a clear two-phase system. This was transferred to a 5 l. separatory funnel and the ether layer decanted. The aqueous phase was extracted three times with ether, and the combined ether extracts were washed with two 500 cc. portions of water. This treatment removed most of the color. After drying rate of crystallization increased as the solid accumulated. Eventually the whole mixture solidified overnight. This was filtered and washed with two 200 cc. portions of ether, giving the desired product M. P. 134–136°. The mother liquors were concentrated to about 300 cc., seeded and allowed to stand at room temperature for 24 hours. A second crop was obtained which upon filtration and drying yielded a solid, M. P. 123–126°. Concentration of the mother liquors to about 100 cc. yielded a material, M. P. 111–119°.

EXAMPLE II

Trans - anti - trans - 1 - methoxy - 8β - acetoxy - 10a-methyl - 4b,5,6,6a,7,8,9,10,10a,10b,11,12 - dodecahydrochrysene XIX The combined crops of crude carbinol (IX) obtained above (80.3 g.) were suspended in 400 cc. of distilled isopropenyl acetate and the mixture refluxed for a short time until solution was complete. After cooling at room temperature 4 g. of p-toluenesulfonic acid monohydrate was added and the mixture swirled to dissolve the catalyst. A slightly exothermic reaction ensued. The slightly cloudy solution was allowed to stand at room temperature overnight. The next morning a heavy crystalline precipitate had formed at the bottom of the flask. The mixture, after cooling to 0° for 24 hours, was filtered and washed with 200 cc. of cold ether. The dried material (M. P. 145–146°) contained a small amount of extremely insoluble substance. In order to remove it, the acetate was dissolved in a small amount of boiling ethyl acetate and diluted with 500 cc. of boiling 95% ethanol. The mixture was allowed to cool down to 40° and filtered through a fluted filter paper. The filtrate was taken down to a small volume and allowed to crystallize completely.

Filtration and washing with ethanol afforded the desired product as thick prisms, M. P. 146–148°. A sample was prepared for analysis by repeated crystallizations from ethyl acetate, until material having a constant melting point was obtained. It was then sublimed at 140°/0.07 mm. and melted at 151.2–152.3°; λ max 271 (log ε, 3.15); λ max 278, (log ε, 3.16); λ min 244, (log ε, 2.18).

*Analysis.*—Calcd. for $C_{22}H_{30}O_3$: C, 77.15; H, 8.84. Found: C, 76.78; H, 8.82.

EXAMPLE III

*Trans-anti-trans-1-methoxy-8β-(10a-methyl) - 12 - diacetoxy - 4b,5,6,6a,7,8,9,10,10a,10b,11,12 - dodecahydrochrysene (XX)*

404.2 mg. of the 8β acetoxy compound (XIX) M. P. 149–150°, 668 mg. of lead tetraacetate (1.0:1.28 moles) and 1 cc. of glacial acetic acid, were heated on the steam bath and the mixture stirred constantly. After 5–10 minutes the solution became clear. A few minutes later the crystalline diacetate (XX) began to separate and within another 10 minutes precipitation was almost quantitative. Sufficient glycerine was added to destroy excess tetraacetate. One cc. of water was added and the precipitate collected and washed three or four times with distilled water.

A sample was prepared for analysis by chromatography on alumina, using benzene as eluent. The white solid so obtained, gave after repeated crystallizations from ethanol (containing a few drops of benzene), elongated plates having M. P. 205.5–211.7° (slight dec. and previous sweating). This M. P. was not improved by further crystallization.

*Analysis.*—Calcd. for $C_{24}H_{32}O_5$: C, 71.96; H, 8.06. Found: C, 71.92; H, 8.04 λ max 275, 281 mμ (log ε 3.38, 3.378) λ min 244 (log ε 2.135).

EXAMPLE IV

*Trans-anti-trans-1-methoxy - 8β - acetoxy - 10a - methyl-4bβ,5,6,6a,7,8,9,10,10a,10bα-decahydrochrysene (XXI)*

The acetate (XIX) (39.4 g.), M. P. 146–148° was suspended in 98 cc. of three times recrystallized glacial acetic acid, the mixture heated to about 100°, and 64.5 g. of lead tetraacetate was added with constant stirring. After 5 minutes the reaction mixture started to clear up, the components dissolving while the acetic acid began to reflux gently. After 8 minutes the mixture was completely homogeneous. The heating was stopped until the internal temperature dropped to 95°, and was then resumed (external temperature 95–100). After a total heating time of 27 minutes the reaction mixture, which now gave a negative test with potassium iodide-starch paper, was cooled, 300 cc. of benzene was added followed by ether, and the resulting cloudy solution was transferred to a separatory funnel, liberally washed with water and dried over sodium sulfate. Evaporation of the solvent left an oil which was dissolved in 600 cc. of glacial acetic acid in a 1 liter flask and heated under nitrogen for 14 hours at 100°. At the end of this period the solvent was removed under reduced pressure (14 mm.). The residue was dissolved in 100 cc. of benzene, and the solvent was again removed in vacuo. This process was repeated once more to remove the last traces of acetic acid. The residue solidified completely in the flask. This material, which consists of crude XXI is suitable for the next step.

A specimen, M. P. 150–155° (soft from 148) was prepared for analysis by two crystallizations from ethanol (M. P. 157.2–159.3°) sublimation at 152°/0.06 mm. and a final crystallization from ethanol. The sample had a M. P. 157.2–159° after drying 12 hours at 0.05 mm./110°.

*Analysis.*—Calcd. for $C_{22}H_{28}O_3$: C, 77.57; H, 8.32. Found: C, 77.37; H, 8.36.

EXAMPLE V

*Trans-anti-trans-1-methoxy-8β,11β-dihydroxy - 10a,methyl-4bβ,5,6,6aα,7,8,9,10,10a,10bα,11,12 - dodecahydrochrysene (XXVII)*

(a) LARGE-SCALE PREPARATION (LITHIUM REDUCTION)

The residue in the flask obtained above was dissolved in 55 cc. of warm benzene. The stirrer was started and 600 cc. of 100% formic acid was added whereupon some of the olefin (XXI) came down as a fine precipitate. A thermometer was inserted in the reaction mixture, and the flask cooled with a cold water bath. When the internal temperature reached 17°, 13.5 cc. of 30% hydrogen peroxide was added all at once and the mixture maintained at 17–20° for the entire reaction period (in order to achieve this, intermittent cooling was necessary as the reaction is slightly exothermic). The reaction mixture cleared up after 25 minutes, and stirring was continued 3 hours longer. At the end of this period the solvents were removed under reduced pressure at 20–30°. The remaining gum was dissolved in benzene-ether and thoroughly washed with water, once with 5% aqueous sodium hydroxide solution and finally carefully with 20% aqueous potassium bicarboate solution. At this point the dark red solution deposited a small amount of black solid at the interface. The solution was washed once with water and dried over sodium sulfate. Filtration, followed by evaporation of the solvent left a reddish brown gum containing the formate, XXVI (R'=HCO).

The gum was dissolved in 670 cc. of commercial anhydrous ethanol and added, with stirring, to a round bottom 12l. flask equipped with a Hershberg stirrer, containing liquid ammonia (5l.). Cut lithium wire (70 g.) was then added over a 30 minute period. As soon as the metal completely dissolved the ammonia was boiled off as described previously. Water was then added and the mixture extracted thoroughly with n-butanol-ether (2:1). The organic extracts were then washed with water and dried over sodium sulfate. Evaporation of the solvent left a partially crystalline solid containing inorganic salts. The residue was dissolved in hot n-butanol and filtered. The butanol was removed under reduced pressure and the brown gum thus obtained was dissolved in methyl ethyl ketone (100 to 150 cc.). Crystals formed immediately. The solution was allowed to stand overnight. The crystalline solid formed was filtered the next day and washed with methyl ethyl ketone. The dried diol (XXVII) so obtained had a M. P. 237–241°.

(b) PREPARATION FROM PURE XXI (SODIUM REDUCTION)

A suspension of 1.166 g. of olefin (XXI), M. P. 151.5–157.5°, was suspended in 20 cc. of 100% formic acid. To this was added in one portion, with constant stirring, 0.41 cc. of 30% hydrogen peroxide. The whole mixture was cooled with a cold water bath to 17°, and the temperature was then maintained between 17–22°. After 30 minutes very little solid was left in the reaction mixture. After 70 minutes the reaction mixture was completely homogeneous. Samples were taken for ultraviolet examination after the 2nd, 3rd, and 4th hour. After being washed well with 20% aqueous potassium bicarbonate solution, all of these samples showed the same type of curve:

$$\lambda_{max.}^{EtOH} 275m\mu$$

with a close shoulder at 283;

$$\lambda_{min.}^{EtOH} 250m\mu$$

After 4 hours and 20 minutes the reaction mixture was worked up as described above.

The gum obtained was dissolved in 30 cc. of commercial absolute ethanol and poured into 300 cc. of liquid ammonia, contained in a 1 l. 3-necked flask equipped with a reflux condenser (Dry Ice-acetone cooling mixture) and a Hershberg stirrer. The system was protected from moisture by a soda-lime tube. Sodium (8.4 g.) was added in small pieces in 7 equal portions over one hour. Each addition of metal produced a rather persistent blue color. After the last traces of sodium reacted the reaction mixture was worked up as described above. Pure ether was used in this run for the extraction. The aqueous basic layer contained some acidic material, for acidification brought down an amorphous dark precipitate. Upon evaporation of the solvent the ether extracts afforded a gummy brown product which partially crystallized. This was triturated with boiling ethyl methyl ketone (4 cc.), cooled, and centrifuged. The solid was washed with cold methyl ethyl ketone (2 cc.) and then with ether (3 cc.). After drying the solid had a M. P. 238–241°. The mother liquors afforded a brown gum. This was dissolved in petroleum ether-benzene (1:1) and chromatographed over 35 g. of Florisil (analytic absorbent sold by the Floridan Co.). The column was made up in petroleum-ether (B. P. 65–68°)-benzene (1:1). Gradual elution with petroleum-ether:benzene, benzene, benzene:ether and ether afforded 253 mg. of carbinol (XVIII), 120 mg. of diol identical with the epimeric $8\beta$, $11\alpha$-diol and 63 mg. of the $8\beta$, $11\beta$-diol (XXVII). Under the conditions used for large scale preparation of (XXVII) and without isolation of the intermediates approximately the same ratio of isomeric diols was obtained as shown by chromatographic analysis. An analytical sample of (XXVII) was obtained after two recrystallizations from ethanol and methyl ethyl ketone; M. P. 240–241°.

EXAMPLE VI dl - D - homo - 18 - nor - 11β - hydroxy - 13,14 - dehydro-epiandrosterone (trans - anti - trans - 1 - keto - 8,11-di-hydroxy - 10a - methyl - 1,2,3,4,4b,5,6,6a,7,8,9,10,10a, 10b,11,12 - hexadecahydrochrysene) XXVIII and dl-D-homo - 18 - nor - 11β - hydroxy - 16,17 - dehydro- epiandrosterone (trans-anti-trans - 1 - keto-8,11-dihydroxy-10a - methyl - 1,4,4a,4b,5,6,6a,7,8,9,10,10a,10b,11,12,-12a-hexadecahydrochrysene) XXIX.

The diol (XXVII) (6.950 g.), M. P. 237–241° was dissolved in tetrahydrofuran (500 cc.) and passed through a column of Florex (Florida fuller's earth, Floridan Co.) (25 g.) made up in the same solvent, to remove impurities and color. The rate of dripping was extremely slow, even when pressure was applied. The column was washed with the same solvent (1.5 l.), the operation being carried out overnight. The combined eluates were concentrated to a small volume and recrystallized from ethanol to give purified XXVII, M. P. 238–241°.

The above diol (XXVII) (6.157 g.) was dissolved in refluxing 675 cc. of dried ethanol. The solution was cooled to 40° and added all at once to a 12 l. 3-necked round-bottomed flask equipped with a Hershberg stirrer, a reflux condenser and a soda-lime tube, and containing 1500 cc. of liquid ammonia. More ethanol (125 cc.) was used in order to transfer the diol completely making the total 750 cc. The diol did not precipitate out of the reaction mixture. Lithium wire (82 g.) was then added over a period of about 2 hours. Efficient stirring gives a homogeneous blue color. But a short time after stirring is stopped a two-phase system is obtained and large drops of copper colored liquid surrounded by a blue phase appear at the surface of the mixture. At this point the preponderant lower phase appears colorless. After one hour the lithium reacted very sluggishly and failed to liquefy to the copper colored phase. It was necessary then to add more ethanol and more ammonia over the last hour of the reaction in the following order:

|   | Ethanol, cc. | Ammonia, cc. |
|---|---|---|
| 1 | 200 | 550 |
| 2 | 200 | 150 |
| 3 | 100 |  |
| 4 | 200 |  |
| 5 | 200 | 600 |
| 6 | 100 | 200 |
| 7 | 250 | 200 |
| Total | 1,250 | 1,700 |

At the end of the reaction the ammonia was removed on the steam bath, the reaction mixture diluted with water in order to dissolve the lithium ethoxide, cooled and thoroughly extracted with chloroform. The chloroform layer was washed once with water and dried. Removal of the solvent left a yellowish gum. This product was dissolved in 275 cc. of 95% ethanol and refluxed under nitrogen for one hour with 27.5 cc. of 35% hydrochloric acid and 5.5 cc. of water. The solvent was removed under reduced pressure (30°) and the residue dissolved in boiling chloroform. This solution was washed with aqueous 10% potassium bicarbonate solution, with water and dried. The chloroform solution was taken down to dryness whereupon the residue crystallized. This was triturated with boiling chloroform and filtered, yielding a dry solid, M. P. 274–275°. The mother liquors on evaporation left a crystalline solid, which was triturated with boiling methyl ethyl ketone and left to stand overnight. The next day the solid was filtered and washed with methyl ethyl ketone yielding a crystalline material, M. P. 266–275°. A sample repeatedly recrystallized from n-propyl alcohol, then from ethanol, and finally sublimed melted at 276–277°.

Analysis.—Calcd. for $C_{19}H_{28}O_3$: C, 74.96; H, 9.27. Found: C, 74.82; H, 9.52.

ISOLATION OF (XXIX)

The combined solid fractions obtained above (4.10 g.) were triturated with boiling methyl ethyl ketone and cooled. After filtration there was obtained 3.174 g. of (XXVIII) as a solid, M. P. 270–5°;

$$\lambda_{max.}^{EtOH}\ 247.8\ m\mu$$

$\lambda$ max 12,430 m$\mu$. The combined filtrates and washings yielded 750 mg. when concentrated. This material was fractionally extracted with methyl ethyl ketone as described in the following scheme.

| Extraction | Solvent-soluble material, mg. | Insoluble fraction, mg. |
|---|---|---|
| 1 | 750 | 3,174 ($\lambda$ max 248 m$\mu$). |
| 2 | 520 | 200 ($\lambda$ max 230 m$\mu$). |
| 3 | 300 | 230 ($\lambda$ max 225 m$\mu$). |
| 4 | 257 (oil) | 43 ($\lambda$ max 225 m$\mu$). |

A total of 273 mg. of crude (XXIX), $\lambda$ max 225 m$\mu$ was obtained from the insoluble fractions of extractions 3 and 4. This material was dissolved in chloroform and filtered through 2.3 g. of Florisil (activated magnesium silicate) in chloroform. The main cut was recrystallized from methyl ethyl ketone to yield 164 mg. of material, M. P. 214–234°, $\lambda$ max 225 m$\mu$ with a slight shoulder at 250 m$\mu$. This material could not be satisfactorily purified by crystallization, but on acetylation with isopropenylacetate in acetone it yielded a crystalline diacetate. The diacetate of XXIX was recrystallized three times for analysis from ethanol and then sublimed; M. P. 204–205°.

Analysis.—Calcd. for $C_{23}H_{32}O_5$: C, 71.10; H, 8.30. Found: C, 71.07; H, 8.23.

EXAMPLE VII

*dl - d - Homo - 18 - nor - 11β - hydroxy - epiandrosterone (trans - anti - trans - 1 - keto - 8β,11β - dihydroxy 10a - methyl - octadecahydrochrysene) XXX*

(a) HYDROGENATION OF (XXVIII)

The diol (XXVIII), M. P. 266–275° (3.174 g.) was dissolved in 560 cc. of 95% ethanol distilled from Raney nickel, and transferred to a 1 l. hydrogenation bottle. A solution of 360 mg. of potassium hydroxide in 1 cc. of water was added followed by 1 g. of commercial 10% palladium-on-carbon catalyst. The mixture was shaken in a hydrogenation machine at a starting pressure of 46 p. s. i. of hydrogen. After 45 minutes the theoretical amount of hydrogen was taken up. At the end of one hour the reduction was stopped and the solution filtered through a sintered glass funnel. The filtrate was concentrated to a small volume, acidified with a slight excess of acetic acid and allowed to crystallize overnight. The next day the crystalline white solid was filtered, washed with ethanol, water and dried, affording a first crop, M. P. 252–253°. The mother liquors were concentrated to a small volume and a second crop formed on standing, M. P. 245–251°.

The material, M. P. 252–253°, was purified for analysis. Two crystallizations from methanol, one from methyl ethyl ketone, and sublimation afforded XXX as white prisms, M. P. 256–257°.

Analysis.—Calcd. for $C_{19}H_{30}O_3$: C, 74.47; H, 9.87. Found: C, 74.32; H, 9.92.

(b) HYDROGENATION OF THE DIACETATE OF (XXIX)

The diacetate (10 mg.) was dissolved in 5 cc. of 95% ethanol distilled from Raney nickel and stirred under hydrogen at atmospheric pressure with 5 mg. of commercial 10% palladium-on-carbon catalyst. After 15 minutes the reduction was stopped. The resulting material had no selective absorption in the ultraviolet. After the usual workup there was obtained 8 mg. of white crystals which were washed with ether and dried, M. P. 158–159°. Pure XXX obtained from XXVIII as described above was acetylated with isopropenyl-acetate in acetone. This afforded a material, M. P. 157.5–159°, after washing with ether. A mixed melting point with the material obtained above showed no depression (M. P. of the mixture, 157–159°).

Conversion of *dl* - D - homo - 18 - nor - 11β - hydroxyepiandrosterone (XXX, trans-anti-trans-anti-trans configuration) to the 17-furfurylidene derivative (steroid numbering) (diacetate, M. P. 246–248°, Anal. C, 716; H, 7.73) followed by angular methylation at $C_{13}$ and acetylation gave *dl*-3β,11β - diacetoxy - 17,furfurylidene-D - homoandrostane - 17a - one, M. P. 256–258° (Anal. C, 72.5; H, 8.02) along with the 13-iso (preponderant) isomer, M. P. 242–243° (Anal. C, 72.0; H, 7.68). These angularly methylated $C_{13}$ epimers were ozonized, and the resulting dibasic acids esterified with diazomethane to give, respectively, *dl* - dimethyl 3β,11β - diacetoxyetioallohomobilianate, M. P. 131.5–133° (Anal. C, 64.7; H, 8.12) and 13-iso compound, M. P. 143.5–144.5° (Anal. C, 65.3; H, 8.56). The infrared spectrum of the former epimer was identical with that of the *d*-diester (Anal. C, 65.3; H, 8.30) which was prepared by opening ring D of *d*-3β,11β - dihydroxy - androstane - 17 - one derived from natural sources. Cyclization of the *dl*-diesters with potassium tertiary-butoxide, followed by hydrolysis and decarboxylation, accomplished by heating with aqueous dioxane at 200–210°, gave after saponification *dl*-3β,11β-dihydroxyandrostane - 17 - one, M. P. 249–251.5° (Anal. C, 74.4; H, 9.61) and the 13-iso compound, M. P. 216– 217° (Anal. C, 74.3; H, 9.73). The diacetate of the former isomer melted at 217–217.5° (Anal. C, 70.7; H, 8.97) and had a characteristic infrared spectrum which was identical with that of *d*-3β,11β-dihydroxyandrostane-17-one diacetate derived from natural sources.

The various stereoisomers of the carbinol IX, e. g. VIII, XXV, etc. (all represented generically by Formula XVIII) can be carried through the same series of reactions illustrated above starting with IX, to give the corresponding stereoisomers represented generically by structures XX, XXI and XXVI–XXX, inclusive. For example, the trans-syn-cis carbinol (XXV) was subjected to analogous reaction in the following examples.

EXAMPLE VIII

*Trans - syn - cis - 1 - methoxy - 8β,12 - diacetoxy - 10a-methyl - 4b,5,6,6a,7,8,9,10,10a,10b,11,12 - dodecahydrochrysene (XX)*

A mixture of 1.050 g. of orange trans-syn-cis-1-methoxy - 8β - acetoxy - 10a - methyl - 4b,5,6,6a7,8,9,10,10a, 10b,11,12-dodecahydrochrysene (XXV acetate), M. P. 130–132°, and 2.100 g. of lead tetraacetate in 1.0 ml. of acetic acid (distilled from potassium permanganate) was heated with occasional swirling for 35 minutes on a steam bath. At the end of this time a few crystals of lead tetraacetate remained undissolved. After a few drops of glycerine were added to react with the remaining lead tetraacetate, water and ether were added and the layers separated. The aqueous layer was extracted twice with ether and the combined ether layers were washed with saturated sodium bicarbonate and sodium chloride solutions and dried over anhydrous sodium sulfate. The ether was evaporated in a current of air to leave an oil which was crystallized by scratching to give an orange solid, M. P. 158–175°. Recrystallization from ethanol gave (XX), M. P. 178–185°, (trans-syn-cis configuration) and a second crop, M. P. 172–184°.

Repeated crystallization from ethanol gave colorless prisms, M. P. 187–189° (vac.) (dec.); λ max 275 mμ (log ε3.44), 282 (3.45); λ min 251 (2.76), 278 (3.43).

Analysis.—Calcd. for $C_{24}H_{32}O_5$: C, 71.97; H, 8.05. Found: C, 71.89; H, 8.11.

EXAMPLE IX

*Trans - syn - cis - 1 - methoxy - 8β - acetoxy - 10a - methyl - 4b,5,6,6a,7,8,9,10,10a,10b - decahydrochrysene (XXI)*

The above 0.670 g., M. P. 178–185°, of diacetate XX and 0.078 g. additional XX, M. P. 172–184°, was dissolved in 10 ml. of acetic acid and heated for 2 hours at 120°. The solvent was removed in a current of air on a steam bath and the residue crystallized from ethanol to give the olefin XXI (trans-syn-cis configuration), M. P. 138–140°, and a second crop, M. P. 136–139°.

Repeated recrystallization from ethanol gave colorless, small needles, M. P. 143.5–144.5°; λ max 269 mμ (log ε 4.01), 298 (3.75), 309 (3.71); λ min 243 (3.52), 293 (3.67), 305 (3.67).

Analysis.—Calcd. for $C_{22}H_{28}O_3$: C, 77.61; H, 8.29. Found: C, 77.54; H, 8.42.

Sometimes a different polymorphic form of the olefin was obtained which had M. P. 120–121° and then resolidified to melt 137–140°.

EXAMPLE X

*Treatment of the olefin XXI with perbenzoic acid*

To a solution of 0.200 g., M. P. 139–142°, of the olefin XXI (trans-syn-cis configuration) in 2 ml. of chloroform was added 1.4 ml. of perbenzoic acid in benzene (.00045 mole per ml.). After standing at 0° for 25 hours, the mixture gave a negative test to starch-iodide paper. Ether was added and the solution was washed twice with cold 10% potassium hydroxide solution and then saturated sodium chloride solution. After drying over anhydrous sodium sulfate, the solvent was evaporated in a current of air to leave a colorless oil which was chromatographed on 12 g. of Florisil (activated magnesium silicate). When the column was eluted with benzene, there was obtained 0.009 g. of starting material, M. P. 138–141°, which on admixture with authentic olefin gave M. P. 139–143°. When the column was eluted with 1:12 ether:benzene, there was obtained 0.087 g. of crystalline material, M. P. 165–192°. Repeated recrystallization from ethanol gave small elongated prisms, M. P. 198–200°; λ max 226 mμ (log ε 4.31), 274 (3.58), 281 (3.56); λ min 256 (3.20), 278 (3.55). The ultraviolet and infrared spectra and the analysis showed that the compound was trans-anti-cis-1-methoxy - 8β - acetoxy-11-hydroxy - 12 - benzoxy-10a-methyl-4b,5,6,6a,7,8,9,10,10a, 10b,11,12-dodecahydrochrysene (XXVI, R'=C₆H₅CO).

Analysis.—Calcd. for $C_{29}H_{34}O_6$: C, 72.78; H, 7.16. Found: C, 72.64; H, 7.27.

The cis-anti-trans carbinol XV was subjected to analogous reactions in the following examples:

EXAMPLE XI

Cis-anti-trans-1-methoxy-8α-acetoxy-10a-methyl-4b,5,6,6a, 7,8,9,10,10a,10b,11,12-dodecahydrochrysene (XIX)

30 ml. of acetic anhydride was added to 9.96 g. of the alcohol (XV), M. P. 149–153°, dissolved in 60 ml. of pyridine. The solution was heated on a steam cone in a loosely stoppered flask for 15 minutes, and was then cooled to room temperature. Water and ice were slowly added with efficient stirring and further cooling when the temperature of the solution rose above 25°. After 350 ml. of water had been added, the crystalline acetate was filtered and successively washed with water, dilute acetic acid, and generously with water. The product was air dried, yielding the acetate XIX (cis-anti-trans configuration), M. P. 107–112°.

EXAMPLE XII

Cis-anti-trans-1-methoxy-8α,12α-diacetoxy-10a-methyl-4b, 5,6,6a,7,8,9,10,10a,10b,11,12-dodecahydrochrysene (XX)

A solution of 20.00 g. of the monoacetate XIX (cis-anti-trans configuration) (M. P. 111–114°) in 50 ml. of glacial acetic acid (purified by distillation from potassium permanganate) was heated to 95° in a 3-necked 500 ml. round bottom flask equipped with a reflux condenser and a Hershberg stirrer. To the vigorously stirred solution was added 34.0 g. of lead tetraacetate maintaining the temperature of the solution below 110°. The addition took 5 minutes; in another 10 minutes a negative starch-iodide test indicated the absence of lead tetraacetate and the completion of the reaction. The solution was immediately cooled and taken up in benzene. This was washed three times with water, each aqueous layer being back-washed with a second portion of benzene. The combined extracts were dried over sodium sulfate and concentrated to near dryness in vacuo, giving a residue containing XX (cis-anti-trans configuration).

EXAMPLE XIII

Cis-anti-trans-1-methoxy-8α-acetoxy-10a-methyl-4b,5,6, 6a,7,8,9,10,10a,10b-decahydrochrysene (XXI)

The oily residue of XX (cis-anti-trans configuration), prepared in the preceding example, was taken up in 300 ml. of glacial acetic acid and heated in a steam bath (internal temperature of the solution: 93–95°) for 17 hours in an atmosphere of nitrogen. The solution was then concentrated to about 80 ml. under reduced pressure and cooled to room temperature. After the material had crystallized, it was filtered and washed with cold methanol. The first crop contained 13.89 g. of the styrene acetate XXI (cis-anti-trans configuration), M. P. 143–145° (M. P. of the analytical sample: 145–146°). A second crop was obtained by concentrating the mother liquors to dryness in vacuo, and then taking up the residue in 20 ml. of methanol. This yielded an additional 2.06 g. (M. P. 134–140°).

EXAMPLE XIV

Cis-anti-trans-1-methoxy - 8α,acetoxy-11-hydroxy-12-benzoyloxy - 10a - methyl-4b,5,6,6a,7,8,9,10,10a,10b,11,12-dodecahydrochrysene (XXVI, R'=C₆H₅CO).

To 126.3 g. of the styrene acetate XXI (cis-anti-trans configuration) (M. P. 138–143°) in 600 ml. of benzene at about 6° was added 1100 ml. of an 0.393 M solution of perbenzoic acid in benzene (0.432 mole). (This material was prepared by the method described in "Organic Reactions," vol. VII, p. 393.) The reaction was allowed to stand at this temperature for 50 hours. The course of the reaction was followed by titration of the unreacted peracid; consumption of the peracid virtually ceased after 26 hours. The excess peracid was removed by shaking with aqueous sodium sulfite (until the organic solution gave a negative starch-iodide test). The benzene layer was washed with cold 5% potassium hydroxide and twice with water, each aqueous wash being back-extracted with 400 ml. of benzene in a second separatory funnel. The combined benzene solutions were dried over sodium sulfate and concentrated to dryness in vacuo, care being taken to keep the temperature of the solution below 40°. This yielded 175 g. of amorphous material (the ultraviolet spectrum showed maxima at 223, 272 and 278 mμ) XXVI (cis-anti-trans configuration).

EXAMPLE XV

Cis - anti - trans - 1 - keto - 8α,11β - dihydroxy - 10a - methyl - 1,2,3,4,4b,5,6,6a,7,8,9,10,10a,10b,11,12 - hexadecahydrochrysene (XXVIII) and cis - anti - trans - 1-keto - 8α,11β - dihydroxy - 10a - methyl - 1,4,4a,4b,-5,6,6a,7,8,9,10,10a,10b,11,12,12a - h e x a d e cahydrochrysene (XXIX)

The crude perbenzoic acid product (XXVI

R'=C₆H₅CO cis-anti-trans configuration) (66.3 g.) was dissolved in 1.8 l. of anhydrous ethanol and this was added to 3.6 l. of anhydrous ammonia in a 12 l. 3-necked round bottom flask equipped with a Hershberg stirrer and a Dry Ice condenser with a soda-lime drying tube, the flask being mounted on a disconnected steam bath. Lithium wire (85 g.) was added to the stirred solution over a period of 1.5–2 hours, the initial addition being made slowly. The last 60 g. of metal were added in batches of ca. 20 g. each, allowing consumption of each of the three portions before the next was added. After the next-to-last addition it was found necessary to add 500 ml. of ammonia (this is due to the loss of from 1–2 liters of ammonia during the addition of the lithium, since, during this time, the flask is open to the air. The addition is necessary when the lithium forms bronze-colored pools on the surface of the reaction mixture without causing a blue color throughout). After the lithium had all reacted, the ammonia was removed by heating, frothing being controlled by the addition of 500 ml. of ether. When the temperature of the solution had reached 40–50°, the steam was turned off and 2 l. of ice water was added, the first portions being added slowly. Two liters of benzene were then added to the solution and the mixture was stirred for a few minutes. The material was transferred to a 5 l. separatory funnel. The aqueous layer was drawn off and then extracted with an additional 2 l. of benzene. Each benzene extract was washed in turn with three 2 l. portions of water in order to remove some color and the base. The extracts were combined, dried over sodium sulfate and concentrated to dryness in vacuo. The enol ether crystallized out in two crops: M. P. 165–177° and M. P. 172–181°. An analytically pure specimen melted at 193–194°.

A solution of 41.48 g. of the crude crystalline enol ether in 1.2 l. of ethanol containing 300 ml. of water and 75 ml. of concentrated hydrochloric acid was heated at reflux in a nitrogen atmosphere for 1 hour. The solvent was concentrated in vacuo to about 200 ml. and the solution was then extracted with two 700 ml. portions of chloroform, each extract being washed in turn with water, aqueous sodium bicarbonate and water. The extracts were combined, dried over sodium sulfate and concentrated under reduced pressure to a small volume. An ether trituration gave crystalline unsaturated ketone (XXVIII, cis-anti-trans configuration), M. P. 203–218° (M. P. of the analytical sample was 227.0–227.5°), $\lambda$ max 248 m$\mu$. A second crop of, M. P. 178–190° was also obtained and combined with the first. The lower melting point is due in part to the presence of XXIX (cis-anti-trans configuration).

Example of a smaller run: 3.02 g. of the crude perbenzoic acid oxidation product XXVI (cis-anti-trans configuration) was dissolved in 180 ml. of absolute ethanol and added to 360 ml. of ammonia. Lithium wire (21 g.) was added over a period of one hour. The workup was the same as described above. The entire residue from the benzene extract was dissolved in 300 ml. of ethanol containing 75 ml. of water and 25 ml. of concentrated hydrochloric acid and heated at reflux in a nitrogen atmosphere for one hour. The solution was concentrated to dryness and then triturated with ether yielding a solid material with a wide melting range. Crystallization from acetone gave 470 mg. of XXVIII (cis-anti-trans configuration), M. P. 212–216°.

EXAMPLE XVI

*Cis - anti - trans - 1 keto - 8$\alpha$,11$\beta$ - dihydroxy - 10a - methyl - octadecahydrochrysene (18 - nor - D-homoetiocholane-3$\alpha$,11$\beta$-diol-17a-one) (XXX)*

A solution of 41.50 g. (the entire crystalline mixture from the preceding experiment) of the unsaturated ketones XXVIII and XXIX (cis-anti-trans configuration) in 400 ml. of ethanol containing 10 ml. of 10% aqueous potassium hydroxide and 3 g. of 10% palladium-on-carbon absorbed 0.14 mole of hydrogen at 50 p. s. i. in 35 minutes. When the uptake of hydrogen had virtually stopped, the solution was filtered and then concentrated to a small volume under reduced pressure. An ultraviolet spectrum of this material showed no maximum at 248 m$\mu$, but showed a strong end absorption. The material was taken up in chloroform and this solution was washed with water. Concentration of the dried extract in vacuo and crystallation from ethyl acetate-ether gave crystalline XXX (cis-anti-trans configuration), M. P. 169–173° (M. P. of the analytical sample: 184–185°).

The compounds of the invention having a hydroxy group in the 8-position of the chrysene nucleus can be utilized either in the free alcohol form or in the form of esters derived from carboxylic acids of relatively low molecular weight, i. e. from one to about eight carbon atoms. The nature of the acyloxy groups in the 8-position of said esters is not critical, but preferred types are those derived from lower aliphatic carboxylic acids, monocycloaliphatic carboxylic acids and monocarbocyclic aromatic acids. Illustrative of such preferred types of acyl groups are lower-alkanoyloxy groups; e. g. formyloxy, acetoxy, propionoxy, butyroxy, isobutyroxy, valeryloxy, trimethylacetoxy, caproyloxy, isocaproyloxy, heptanoyloxy, octanoyloxy, and the like; carboxyl-lower-alkanoyloxy groups; e. g. hemi-succinyloxy, hemi-glutaryloxy, hemi-adipyloxy, and the like; and monocarbocyclic aroyloxy groups, e. g. benzoyloxy, p-toluyloxy, p-nitrobenzoyloxy, 3,5-dinitrobenzoyloxy, and the like. The acyloxy groups can contain substituents such as nitro, methoxy, halogen, etc. which are inert to the reaction conditions used for the preparation of the esters.

The methoxy group (OCH$_3$) in compounds I–XXVII can be replaced by equivalent OR groups where R represents a lower alkyl such as ethyl, propyl, butyl and octyl as well as equivalent hydroxy and lower alkoxy substituted lower alkyl groups such as 2-hydroxyethyl, 2-methoxyethyl and the like. The R, which is preferably an inert aliphatic group containing 1 to 8 carbon atoms, serves merely as a blocking or protective group during the initial reactions and is removed as shown in compounds XXVIII–XXX to provide the desired keto group. All references to melting and boiling points are given in ° C.

We claim:

1. A product selected from the group consisting of trans-anti-trans and cis-anti-trans 1-RO-8,12-di-lower-alkanoyloxy - 10a - methyl - 4b,5,6,6a,7,8,9,10,10a,10b, 11,12-dodecahydrochrysene, where R is a lower alkyl group.

2. A product selected from the group consisting of trans-anti-trans and cis-anti-trans 1-RO-8-lower-alkanoyloxy - 10a - methyl - 4b,5,6,6a,7,8,9,10,10a,10b - decahydrochrysene, where R is a lower alkyl group.

3. A product selected from the group consisting of trans-anti-trans and cis-anti-trans 1-RO-8,11-dihydroxy-10a-methyl-4b,5,6,6a,7,8,9,10,10a,10b,11,12-dodecahydrochrysene, where R is a lower alkyl group.

4. A product selected from the group consisting of trans-anti-trans and cis-anti-trans 1-keto-8,11-dihydroxy-10a - methyl - 1,2,3,4,4b,5,6,6a,7,8,9,10,10a,10b,11,12-hexadecahydrochrysene and trans-anti-trans and cis-anti-trans 1-keto-8,11-dihydroxy-10a-methyl-1,4,4a,4b,5,6,6a,7, 8,9,10,10a,10b,11,12,12a-hexadecahydrochrysene.

5. dl-D - homo - 18 - nor - 11$\beta$ - hydroxy - 13,14 - dehydroepiandrosterone.

6. dl - D - homo - 18 - nor - 11$\beta$ - hydroxy - 16,17 - dehydroepiandrosterone.

7. A product selected from the group consisting of trans-anti-trans and cis-anti-trans 1-keto-8,11-dihydroxy-10a-methyl-octadecahydrochrysene.

8. dl-D-homo-18-nor-11$\beta$-hydroxyepiandrosterone.

9. 18-nor-D-homoetiocholane-3$\alpha$-11$\beta$-diol-17a-one.

10. The process of preparing 1-methoxy-8,12-diacetoxy - 10a - methyl - 4b,5,6,6a,7,8,9,10,10a,10b,11,12-dodecahydrochrysene with a structure in accordance with claim 1 which comprises heating a compound selected from the group consisting of trans-anti-trans and cis-anti-trans 1 - methoxy - 8 - acetoxy - 10a - methyl - 4b,5,6,6a,7, 8,9,10,10a,10b,11,12-dodecahydrochrysene with lead tetraacetate in acetic acid solution.

11. The process of preparing 1-methoxy-8-acetoxy-10a - methyl - 4b,5,6,6a,7,8,9,10,10a,10b-decahydrochrysene with a structure in accordance with claim 2 which comprises heating 1-methoxy-8,12-diacetoxy-10a-methyl-4b,5,6,6a,7,8,9,10,10a,10b,11,12 - dodecahydrochrysene with a structure in accordance with claim 1 in acetic acid solution.

12. The process of preparing 1-methoxy-8,11-dihydroxy - 10a - methyl - 4b,5,6,6a,7,8,9,10,10a,10b,11,12-dodecahydrochrysene with a structure in accordance with claim 3 which comprises reacting 1-methoxy-8-acetoxy-10a - methyl - 4b,5,6,6a,7,8,9,10,10a,10b - decahydrochrysene with a structure in accordance with claim 2 with a carboxylic peracid having one to eight carbon atoms and reacting the resulting compound with an alkali metal-ethanolic liquid ammonia reaction mixture, where the alkali metal is selected from the group consisting of sodium and lithium.

13. The process of preparing 1-keto-8,11,dihydroxy-10a-methyl-octadecahydrochrysene with a structure in accordance with claim 7 which comprises reducing 1-methoxy - 8,11 - dihydroxy - 10a - methyl - 4b,5,6,6a,7,8,9,10, 10a,10b,11,12-dodecahydrochrysene with a structure in accordance with claim 3 with lithium in an ethanol-liquid ammonia reaction mixture, and catalytically hydrogenating the resulting 1-keto-8,11-dihydroxy-10a-methyl-hexadecahydrochrysenes in the presence of a palladium catalyst.

14. The process which comprises heating a compound selected from the group consisting of trans-anti-trans and cis-anti-trans 1-RO-8-lower-alkanoyloxy-10a-methyl-4b,5,6,6a,7,8,9,10,10a,10b,11,12 - dodecahydrochrysene with lead tetraacetate in acetic acid solution, heating the resulting 1-RO-8-acyloxy-12-acetoxy-10a-methyl-4b,5,6,6a,7,8,9,10,10a,10b,11,12-dodecahydrochrysene in acetic acid, reacting the resulting 1-RO-8-acyloxy-10a-methyl-decahydrochrysene with a carboxylic peracid having one to eight carbon atoms, reacting the resulting 1-RO-8,12-diacyloxy, 11-hydroxy-10a-methyl-4b,5,6,6a,7,8,9,10,10a,10b,11,12-dodecahydrochrysene with an alkali metal-ethanolic-liquid ammonia reaction mixture, reacting the resulting 1-RO-8,11-dihydroxy-10a-methyl dodecahydrochrysene with an alkali metal-ethanolic-liquid ammonia reaction mixture, hydrolyzing the resulting product in aqueous acid, and catalytically reducing the resulting 1-keto-8,11-dihydroxy - 10a - methyl-hexadecahydrochrysenes to 1-keto-8,11-dihydroxy-10a-methyl-octadecahydrochrysene in the presence of a palladium catalyst, where R is a lower alkyl group and the alkali metal is selected from the group consisting of sodium and lithium.

References Cited in the file of this patent
UNITED STATES PATENTS

| | | |
|---|---|---|
| 2,324,881 | Ruzicka et al. | July 20, 1943 |
| 2,351,637 | Ruzicka et al. | June 20, 1944 |

OTHER REFERENCES

Johnson et al.: J. Am. Chem. Soc., 76 (1954), pp. 3353–4.

Windaus et al.: Liebig's Am. Chim., 552 (1942), 442–52.

Johnson et al.: J. Am. Chem. Soc., 75 (1953), p. 2275–6.